Nov. 30, 1954  J. FRYE  2,695,675
CONTROL FOR MAGNETIC FLUID TRANSMISSION DRIVE TO VEHICLE WHEELS
Filed March 8, 1950  4 Sheets-Sheet 1
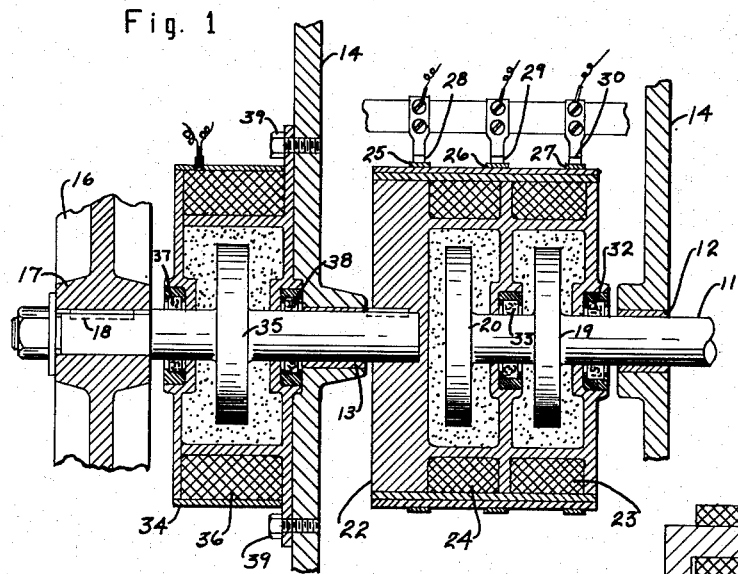
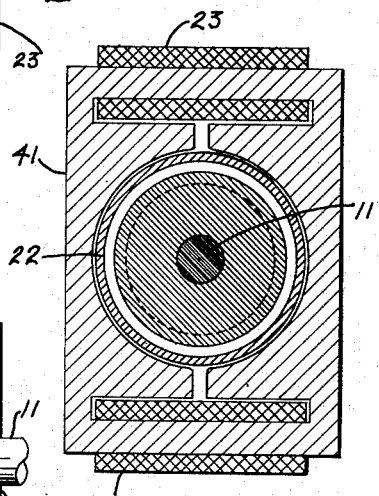
Fig. 3
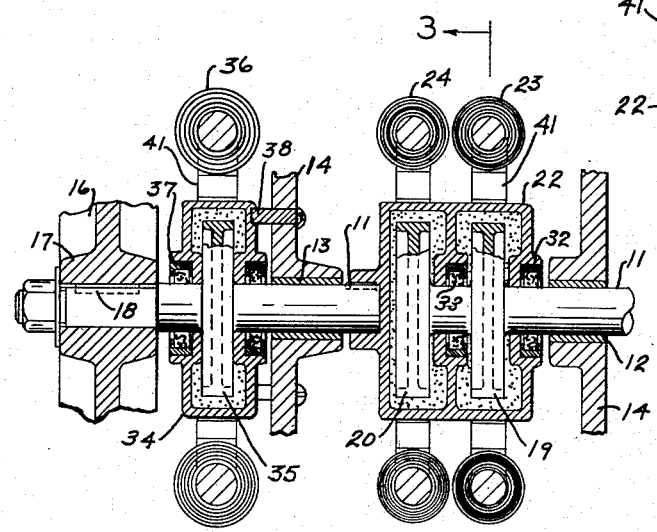
Fig. 2
INVENTOR
JACK FRYE
BY
Donald F. McCarthy
ATTORNEY Nov. 30, 1954 J. FRYE 2,695,675
CONTROL FOR MAGNETIC FLUID TRANSMISSION
DRIVE TO VEHICLE WHEELS
Filed March 8, 1950 4 Sheets-Sheet 4

INVENTOR
JACK FRYE
BY
Donald F. McCarthy
ATTORNEY

United States Patent Office 2,695,675
Patented Nov. 30, 1954

2,695,675

CONTROL FOR MAGNETIC FLUID TRANSMISSION DRIVE TO VEHICLE WHEELS

Jack Frye, Sedona, Ariz.

Application March 8, 1950, Serial No. 148,477

11 Claims. (Cl. 180—6.28)

This invention relates to power transfer systems and the control thereof, and more particularly, to automotive vehicle power transmission systems.

Conventional power transfer in motor vehicles is generally obtained by mechanical gearing and similar clutch mechanism between the motive power source and the traction wheels. Gear transmissions have the disadvantage of poor flexibility, requiring particular skill in operation.

Fluid couplings have heretofore been proposed in place of the mechanical expedients and give improved results. However, such couplings are complicated in constructional features, introduce an energy loss which must be dissipated in heat depending on the inertia and compressibility of the fluid, and operate efficiently only at high motor speeds.

In all such fluid transmissions, the torque developed depends on the mass, represented by the viscosity of the fluid and the pressure to which the fluid is subjected by means of the rotational velocity of the compressing mechanism. Of these, only the rotational velocity could heretofore be varied, since the viscosity of the fluid has been an invariable physical property insofar as such variation could be feasible during operation of the power transfer device.

In view of physical limitations of prior art fluid transmissions, only a single fluid coupling has been advocated to replace the mechanical clutch, and such coupling operates generally in conjunction with a gear transmission.

A particular feature of this invention is that the transmission system eliminates all the disadvantages inherent in prior art fluid transmissions, and provides an electrically controlled fluid coupling of extreme flexibility.

The foremost object of the invention is to utilize in a vehicular transmission, ferromagnetic fluids for the power transfer medium.

Another object of the invention is to arrange ferromagnetic couplings between the driving engine and the traction wheels in such a manner as to eliminate the mechanical intercoupling between such wheels, generally referred to as a differential.

A further object of the invention is to devise an electrical control for proposed fluid couplings which will be simple to operate and automatic in action for the differential transfer of power by the traction wheels.

It is a salient feature of this invention also that each traction wheel may be directly driven from the engine independently from the other.

Among the advantages resulting from the herein described clutch transmission system, the following are of marked importance: The clutch between the engine and the drive shaft of the car may be entirely eliminated, the differential transmission heretofore used in automotive vehicles is no longer necessary, and the traction wheels may have an automatically compensated uniform torque in accordance with the tractive force of each individual wheel.

Other features, objects and advantages will be apparent from the following description of the invention, pointed out in particularity in the appended claims, and taken in connection with the accompanying drawings, in which:

Figure 1 shows in cross-section the elemental construction of a ferromagnetic fluid coupling;

Fig. 2 shows, also in cross-section, another type of ferromagnetic fluid coupling;

Fig. 3 is a sectional view taken along lines 3—3 of Fig. 2;

Figure 4:
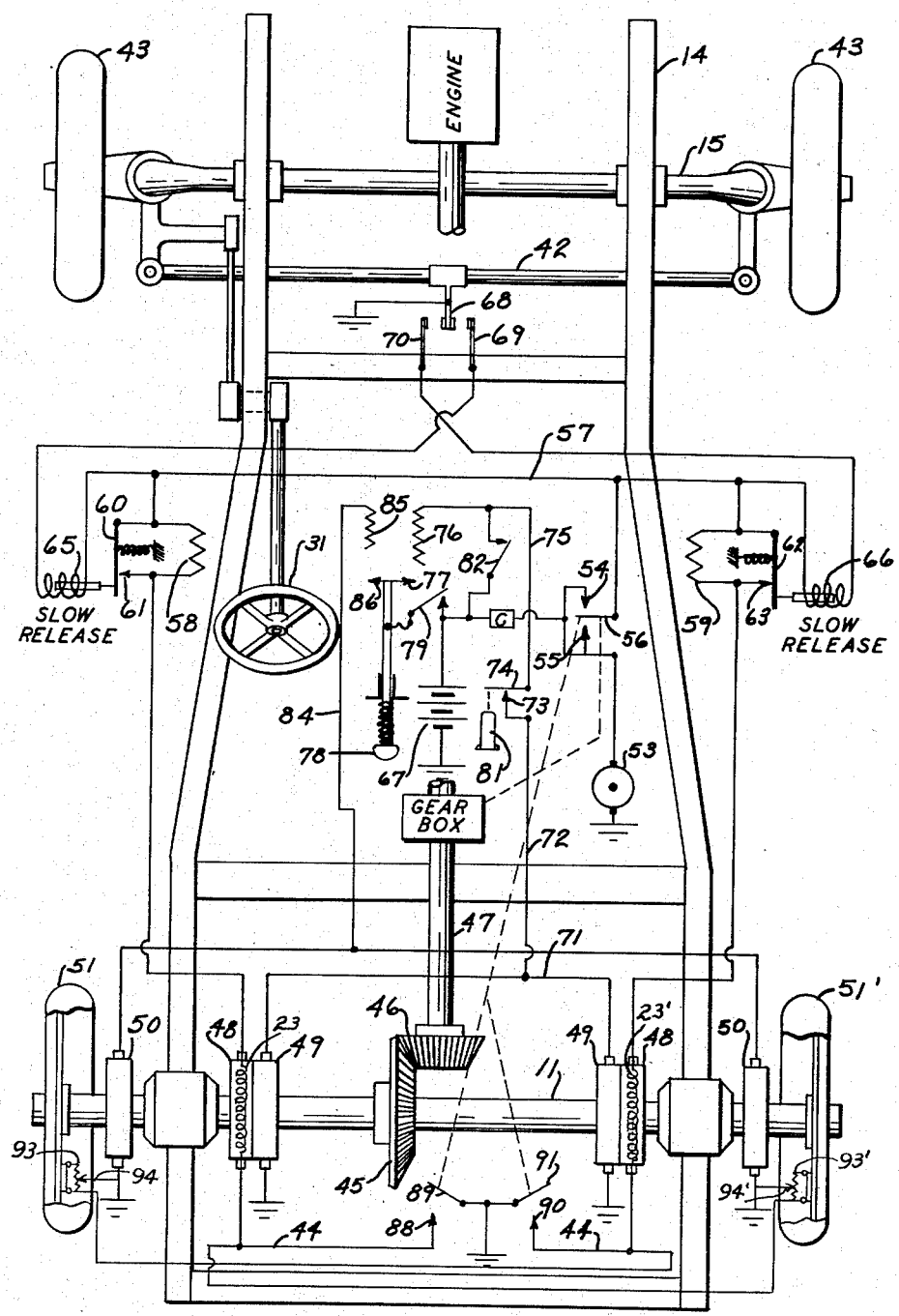
Fig. 4 is a schematic pictorial circuit diagram of the electrical control applied to a motor vehicle equipped with ferromagnetic transmission and brakes.

Ferromagnetic clutches have been proposed for power transfer applications and described in the literature, as, for example, in the Technical News Bulletin of the Bureau of Standards, May 1949, pages 49–60. These consist, essentially, of a housing suitable to contain a liquid in which the ferromagnetic material is held in suspension and rotating members immersed in the fluid. The basic principle upon which these clutches function is that the viscosity of such fluids may easily be changed and controlled, being directly related to the strength of an applied magnetic field, which acts on the suspended particles. To produce a controllable magnetic field, an electromagnetic winding may be incorporated in the housing, or the latter may be surrounded by an electromagnet of suitable shape and flux-producing strength.

The magnetic forces acting on the minute particles cause them to cohere and form a chain along the lines of force, and this is capable of changing a fluid of comparatively low viscosity into high viscosity, or even into an apparent solid. The fluid may consist of oil or silicon liquid, and the ferromagnetic substance in a powder form may be pure iron or oxides. However, carbonyl iron proved to be the most suitable of these substances, each particle having a diameter in the neighborhood of 8 microns.

When the housing of the clutch is of magnetic material, it forms one of the rotating elements, and if the winding is embedded in the housing, the electrical connections must be brought out over slip rings which are contacted with brushes supplying the current. In certain types of clutches, the windings may be upon a stationary core inside of which one of the rotating elements forms a housing for the liquid and is attached to one of the shafts which is to be coupled with the rotor inside the housing connected with the other shaft.

The present invention is directed chiefly to the application of magnetic fluid clutches, and these are, therefore, illustrated purely for the purpose of explaining the operation of the transmission system and the control thereof. Various improvements may be made to clutch elements per se inasmuch as the proper fluid, the consistency of the mixture, the sealing thereof, and the magnetic efficiency of the assembly play an important part in the overall design.

Referring to Figure 1, the fluid couplings are illustrated as applied to an axle or shaft 11 which rotates in bearings 12 and 13 supported on suitable parts of a frame or chassis 14. The axle 11 terminates in the wheel 16, the hub 17 of which may be attached in the usual manner by means of a key 18. In fact, the axle 11 is in two parts, one carries the rotating elements 19 and 20 of the clutch proper, whereas the other part is securely fastened to the housing 22 of the fluid coupling. Magnetizing windings 23 and 24 surround the housing 22 and the slip rings 25, 26 and 27 provide for the transfer of current to these windings, one of which is a common terminal for both. The slip rings contact with brushes 28, 29 and 30, respectively.

The clutch shown here represents, by way of example, the basic type of fluid coupling. The magnetic fluid is indicated in the cavity of the housing by small dots. Seals 32 and 33, which may be of rubber or other suitable sealing compounds, prevent the flow of the liquid around the axle 11. The clutch is of dual construction, one part comprising the rotating element 19, complementary portion of the housing 22, the other the rotating element 20, and the other half of the housing 22. Both rotating elements are on the same shaft. While the two couplings have a common housing, they may also be separated, to form two individual fluid couplings properly tied together. The purpose of the dual coupling will be described in greater detail later.

The portion of the shaft 11 which carries the housing 22 at one end, and the wheel at the other end, has a similar fluid clutch device, although it performs no power transfer function, comprising a housing 34, rotating element 35 and magnetizing winding 36. Seals 37 and 38 perform the same function as previously described. This fluid clutch replaces the conventional brake. It is seen that the housing 34 is securely fastened by means of bolts 39, to the frame 14. Consequently, it cannot rotate. Being stationary, it requires no slip rings for the conducting wires which are brought out from the housing 34 in any suitable manner. The function of this fluid clutch device as a brake will be further explained in connection with the operation of the fluid drive system.

Fig. 2 depicts essentially the same arrangement of parts as shown in Fig. 1, except that it illustrates the type of fluid couplings which have a separate electromagnet for providing the necesary magnetizing flux and, therefore, since these do not rotate, the windings require no slip rings for the electrical connection, which has certain practical advantages. Inasmuch as the component elements are essentially the same as that shown in Fig. 1, similar reference characters are used to denote identical parts. The axle 11 is also in two parts, the one supported in the bearings 12 of the frame 14 carries the rotating elements 19 and 20 immersed in the ferromagnetic fluid in the divided housing 22. The rotating elements have a T-shaped cross-section which provides for a larger active frictional surface than a plain disc. The housing 22 is sealed off by means of the seals 32 and 33, and is attached to the other portion of the axle 11, which terminates in the wheel 16 in a manner previously described. The wheel portion of the axle is also supported in a suitable bearing 13 in the frame 14. The fluid brake is similar in construction to the fluid clutch comprising a housing 34 surrounding a rotating element 35 and sealed to the shaft by means of the seals 37 and 38. The magnetizing windings 23 and 24 of the coupling device are wound onto a core 41 of oblong shape, as seen in the cross-sectional view of Fig. 3. This core surrounds the housing 22, leaving as small an air gap as feasible so that rotation of the housing shall not be impeded.

Referring to Fig. 4, the complete electrical control circuit for the fluid transmission, as well as brake elements, is seen applied to an automotive vehicle of which only such portions are shown in a skeleton view which are necessary to an understanding of the invention. These portions comprise a frame or chassis 14, carrying the rear axle 11 and the front axle 15. The conventional gearing mechanism is shown for the front axle 15 including a tie rod 42 connected to the displaceable front wheels 43. A suitable gearing and connection terminates in the steering wheel 31. Since the invention has no bearing on the particular steering mechanism, it is not considered essential to describe this in detail. Any suitable steering device may be used and modified to perform the function which is part of the control system as will hereinafter be described.

The rear axle 11 carries a bevel gear 45 cooperating with a pinion 46, the latter being fastened to a drive shaft 47. A gear box is indicated in the connection of the drive shaft to the engine represented simply by a block diagram so marked. The drive shaft is broken away in order to make feasible a clearer schematic representation of the circuit and elements thereof. It is to be noted that the coupling of the drive shaft by means of the pinion and bevel gear onto the axle is direct and no differential mechanism is used. This feature is of particular importance since the present invention eliminates the need for such a differential with its attendant disadvantages. A brief statement on this point follows:

A differential coupling, as it is well known, has had almost universal use in automotive vehicles in order to permit displacement between the rate of rotational speed of the traction wheels, while at the same time transferring the motive energy to both wheels from the engine. As long as the vehicle continues in a straight line path, both wheels, assuming to be of the same diameter, will turn at the same R. P. M. When a curve is to be negotiated, the wheel describing the larger diameter must necessarily make more revolutions than the wheel describing the smaller diameter of the curved path. If both wheels are tightly coupled to the drive shaft, this would have a disastrous result, swerving the rear end of the car or damaging the wheels. By virtue of a differential coupling the two wheels of such vehicles are free to rotate independently from the other, and when one wheel is held fast the other will revolve at twice the speed than ordinarily. The disadvantage is that when the traction is uneven, the wheel having no traction will revolve at considerable speed, and no useful motive energy is then delivered to the other wheel. If both wheels could independently receive motive force from the engine, no such slippage would occur irrespective of the traction conditions. If one wheel had no traction, the other would provide the motive power. The power drive of the present invention provides for such a distribution of driving energy for the wheels.

Resuming our consideration of Fig. 4, the fluid coupling elements are schematically indicated by block diagrams and it should be understood that each of these represents coupling of the type shown in Figs. 1 and 2, or any suitable type which operates by means of a fluid of which the viscosity may be varied by varying the flux density of a magnet. The fluid couplings associated with the right wheel 51' of the vehicle comprise the drive coupling 48 and the retard coupling 49 which may have a common housing and the brake 50. The identical components associated with the left wheel 51 of the vehicle bear similar reference characters.

Figure 6:
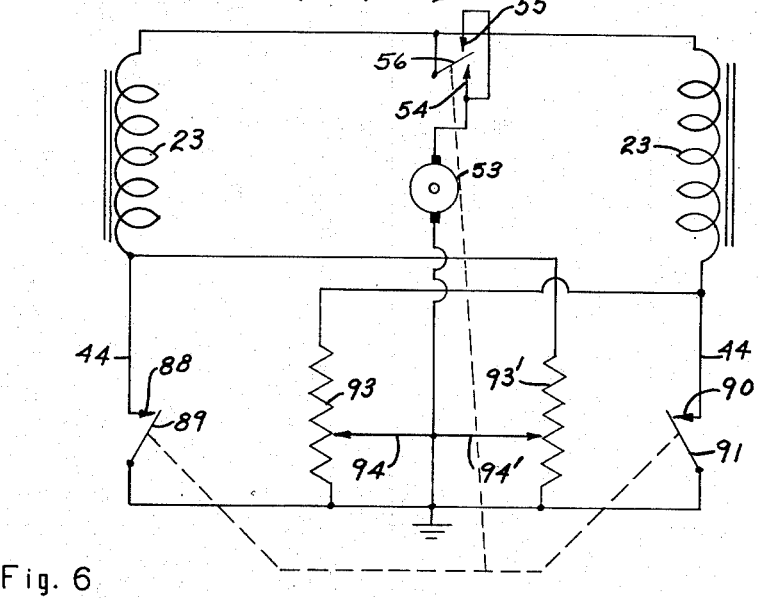
Fig. 6 is a simplified circuit diagram of the automatic torque equalizing means between the component drive elements.

The electrical connection of the drive couplings will be discussed first. The power source for these is indicated by a generator 53, one terminal of which is grounded to the frame of the car. The two terminals of the drive couplings 48 represent the magnetizing winding of which one terminal returns to ground, not shown here. The connection is to a lead 44 one end of which returns to ground potential through variable resistances 93 and 93' located in the right and left rear wheels, respectively, (Fig. 9–93) and is schematically shown in Fig. 6. In considering the circuit, however, let it be assumed that this terminal of the winding for the drive couplings 48 is now at ground potential.

The other terminal of the generator connects to contacts 54 and 55 of a switch which has a contact arm 56 connected to a distribution bus 57, which completes the two circuits to the other terminal of both drive couplings 58. In series with one of these circuits is a resistance 58 and in series with the other a resistance 59. Resistance 58 is short circuited by contacts 60 and 61 of relay switch 65 and resistance 59 is shorted by contacts 62 and 63 of relay 66. As indicated, these relays are of the slow release type.

The contacts 55 and 54 to which the generator 53 is connected are bridged and connect to the positive terminal of the battery 67, of which the negative terminal is grounded. In series with this connection is placed the conventional cut out shown in block diagram carrying the identifying letter "C." This prevents the discharge of the battery through the generator when the latter, which is connected to the engine, is not operating. From this description, it follows that the generator 53, utilized for supplying current to the drive couplings 48, may also be used for charging the battery. It is to be understood that the generator 53 is driven by the engine and the voltage delivered thereby depends on the speed of the engine up to a certain point where conventionally used regulators will maintain a maximum voltage level.

The switch arm 56 designates a lever which is used by the operator in one position for the forward movement and in the other position for reverse of the vehicle. It is shown by the dotted lines that the arm 56 is interlinked with the gear box. The latter need not have other gears than those necessary for reversing the motion of the car.

For the sake of a clearer presentation of the complete system, first the operation of the drive couplings 48 and the circuit just described will be given. Following the circuit, it is seen that when the lever controlling the switch 56 is in mid-position, as shown in Fig. 4, no current is supplied to the drive couplings 48. If the engine is running, the generator 53 supplies current only to charge the battery 67. When the switch arm 56 is placed in such position as to engage either contacts 54 or 55, the circuit is completed from the generator 53 to the drive couplings 48. As soon as the engine is turning beyond a predetermined speed, the windings of the drive couplings 48 will be sufficiently energized to cause such magnetization which exerts a mechanical coupling by means of the ferromagnetic fluid between the rotors and the housing of the clutch, as seen in Fig. 1, transferring power to the wheels 51 and 51'. This coupling is progressively increased as the speed of the engine increases, providing an increasingly tighter frictional contact until above a certain speed of the engine the voltage generated is sufficient to obtain the maximum coupling. As soon as the engine speed decreases, the coupling is progressively lessened until a point is reached when no useful coupling is provided and the vehicle is coasting.

It has been mentioned that the coupling depends on the magnetic flux, which, in turn, depends on the strength of the current. The current may be varied also by inserting a resistance in the circuit. If a suitable resistance is inserted in the circuit of any one of the fluid drives 48, the effective coupling may be controlled individually for each drive. This makes it feasible to provide a simple differential speed between the wheels 50 and 51' when the occasion arises to negotiate a curve. The resistors 58 and 59 serve this purpose. Normally, both are short circuited and have no effect on the current in the circuit. However, when the particular relay which short circuits any one of these resistances is energized, opening the respective contacts 60 and 61 or 62 and 63, the resistance 58 or 59 is automatically inserted in the respective circuit, reducing the current and thereby also reducing the coupling. The energizing of the relays is controlled by the steering mechanism, namely, by a single-pole, double-throw switch, of which the rider 68 carried by the tie rod 42 is grounded, and contacts in one direction of motion, when the front wheels turn to the left, the contact 69, and, in the other direction, the contact 70. The contact 69 connects to the winding of the relay 65 and the contact 70 to the winding of the relay 66. Now, assuming that the wheels are turned toward the right, the contact 70 is engaged and completes the circuit to the relay 66, opening the contacts 62 and 63 and inserting the series resistance 59 in the circuit of the coupling 48 of the right wheel 51'. The reduced current diminishes the normal power transfer and permits the wheel 51', which, in this position of the steering mechanism, will describe the smaller diameter of the curved path, to turn with a lesser degree of energy transfer. The left wheel 50, however, is unaffected and provides the major traction for the vehicle. It must be remembered, however, that the value of the resistance 59 is so proportioned that it will reduce the coupling only to such a degree which is necessary to allow for the required slippage, yet maintain tractive force in the wheel 51'. Similar conditions are provided for the oppositely turned front wheels 43, in which case contact 69 is engaged by the rider 68 and the same control of the coupling is effected for the wheel 50. In negotiating a curve, the front wheels begin to straighten out when the end of the curve is reached before the rear wheels arrive on the straight path. Accordingly, it is not desirable that when the front wheels are partly returned to the normal straight position or when these wheels are already straightened out that the differential relays 65 or 66 under control release immediately, since the rear wheels are still describing a curve. The slow-release characteristic of these relays takes care of this contingency in that the short circuit of the inserted series resistance will be restored only a predetermined time after opening of the contacts controlled by the tie-rod, namely contacts 69 or 70, engaged by the switch arm 68. The release time may be calculated for a certain minimum speed and maximum arcuate path of the vehicle.

In connection with Fig. 1, it was mentioned that the fluid coupling is of two parts in a common housing, each part having a separate energizing winding. The second part of each coupling herein shown is the retard coupling 49. There are two such couplings, one for each wheel, and provide a different function than the drive couplings, in that they are not energized by the generator 53 but from the battery 67. Following the circuit, it is seen that one terminal of the energizing winding of each is connected to ground, and the other interconnects through the lead 71 and conductor 72, switch contact 73 and rider 74, conductor 75, to a variable resistance 76. The rider 77 thereof is mechanically attached to the brake pedal 78. This connection is completed to the positive terminal of the battery through the main switch 79, which may be the ignition switch of the vehicle. The gas pedal 81 which controls the speed of the engine is mechanically interlinked with the switch contacts 73, 74 in such a manner as to open these contacts when the pedal is depressed. The resistance 76 may also be short circuited, if it is so desired, by the switch 82.

Now as to the operation and the purpose of the retard couplings 49, it was mentioned before that drive couplings 48 vary their coupling properties with the speed of the engine. In other words, when the engine is no longer supplying driving power and the vehicle is traveling by its own momentum, as it slows down, progressively less and less will be the transfer of the couplings 48 since the generator also progressively slowing down decreases the current to the windings. Gradually, the car is coasting and the braking power of the engine normally used in motor vehicles would not be efficiently available. The retard couplings 49 have the function to provide this braking power of the engine at any time when the latter is no longer delivering power, either when the brake pedal is depressed and while it is depressed, or, if desired, at all times.

Let us assume that the switch 79 is in the closed position, which must necessarily be so since this is also the ignition switch of the vehicle, and the switch 82 is open, and that the engine delivers no motive power, so that the gas pedal 81 is released, which effects closing of the contacts 73 and 74. When the brake pedal 78 is depressed first, the rider 77 contacts the resistance 76, completing thereby the circuit from the battery to the windings of the retard couplings 49. These being energized, will couple the wheels 50 and 51' to the axle 11 which, in turn, through the gears 45 and 46, transmits the energy of the wheels resulting from the momentum of the vehicle to the engine. Progressively as the brake pedal is depressed, the greater will be the coupling. In this manner, while the brake is actuated, the retarding force of the engine is also increasingly utilized for braking purposes. When the switch 82 is closed, the retarding force of the engine is utilized every time the latter is not delivering power, in that release of the gas pedal 81 completes the circuit through contacts 73 and 74 to the retard couplings, whereas a soon as the engine is again assuming power delivery, contacts 73 and 74, being open, disable the retard couplings 49. In this connection, it should be noted that the drive couplings will transmit the power from the traction wheels due to the momentum of the vehicle to the engine, since as the latter is turned by the shaft 47 the generator 53 is producing voltage which keeps the windings of the drive couplings 48 energized. However, this energy transfer to the engine diminishes in proportion with the slowing down of the vehicle, whereas the retard coupling's transfer is unaffected in that these receive magetizing voltage from the battery which is a steady source whereas the generator 53 is a variable source. From this it is seen that in the utilization of the braking power of the engine both the drive couplings 48 and the retard couplings 49 take an active part.

The brakes 50 connect to the battery 67 in a similar manner having common terminals of their energizing winding connected through the conductor 84 to a variable resistance 85, of which the rider 86 is interlinked with the brake pedal 78. The connection to the positive terminal of the battery is completed through the switch 79, whereas the other terminal is completed through common ground connections of the brake windings.

The operation of the brake of this type is very much the same as the clutch. The only difference is that one rotor element, preferably the housing, is affixed to the frame. When cohesion develops, due to applied magnetic force, the rotor driven by the axle of the wheels is retarded in proportion with the magnetic force applied. The fact that fluid mediums of this type are of an oily substance, extremely smooth, a yielding, yet very firm braking force may be developed, far superior in action to friction type brakes.

The ground return circuit of the drive couplings 48 has been briefly mentioned, and in this connection, to complete the description of Fig. 4, attention is directed to the switch contact 88 which connects to the conductor 44. Contact arm 89 cooperates with contact 88 and is grounded to the frame. Similarly, with respect to drive coupling 48 associated with wheel 51', switch contact 90 and contact arm 91 complete this circuit to ground when either one of these arms is engaging its respective contact. The arms 89 and 91 are mechanically interlinked with the switch arm 56 in such manner that when this arm engages the contact 55, switch contacts 88, 89 and 90, 91 are closed. This occurs in the retard position of the lever which is represented by the contact arm 56 at which time also, by means of the mechanical interlinkage shown, the gear box is in the reverse position.

Figure 5:
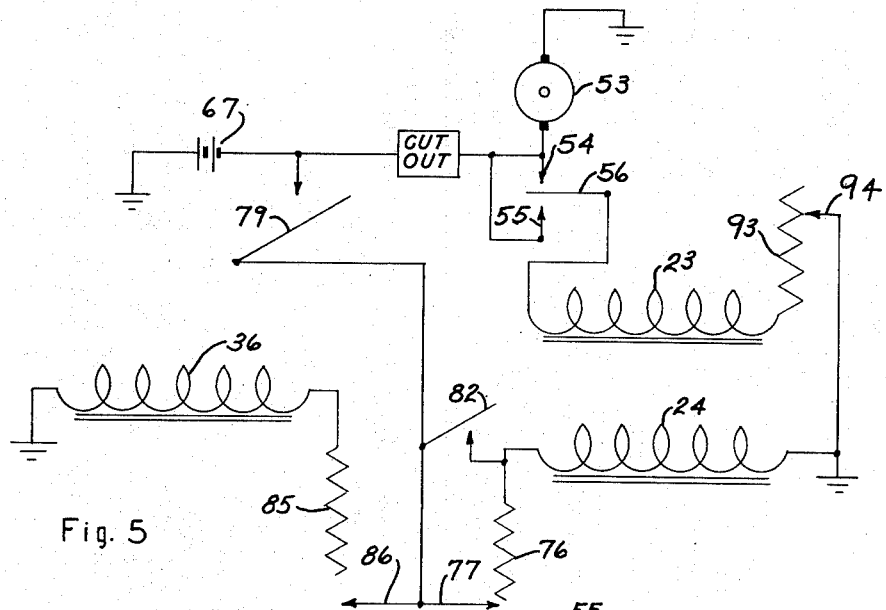
Fig. 5 is a simplified schematic circuit diagram of the electrical system pertaining to the components shown in Fig. 4.

The circuit shown in Fig. 5 is a simplified schematic representation of the system shown in greater detail in Fig. 4. In order to be able to follow these circuits in a more concise manner, similar reference characters denote identical parts. Only one set of the duplicate components is shown. From the generator 53 when the lever arm 56 engages either one of the contacts 54 or 55, the circuit is completed through the winding 23 which is the energizing winding of the drive coupling 48, to the grounded terminal of the generator. A variable resistance 93 having a rider 94 is in series with this circuit. This variable resistance, as mentioned before, is located in the wheel housing and will be described in connection with Fig. 9. Similarly, the circuit to the magnetizing winding 24 is completely from the battery 67 through the switch 79, resistor 76 and rider 77. This circuit may also be completed in bypassing the resistor 76 by the switch 82. The winding 24 is the one associated with the retard coupling 49. The circuit of the winding 36 associated with the brake 50 is completed through the variable resistance 85, rider 86 and switch 79.

The circuit of Fig. 6 will now be described and reference should be had also to Figs. 7, 8, 9 and 10 for the complete understanding of this feature of the transmission control system. Automotive vehicle systems experience road conditions which result in uneven traction of the wheels. When both wheels are driven conjointly, no means can be provided to equalize the torque of the traction wheels. Such equalization is very much desirable to lessen road hazards, such as icy or slippery surfaces. The flexibility of electrical controls and the advantage resulting in independent drives of the wheels in accordance with this invention permit such torque equalization.

Figure 7:
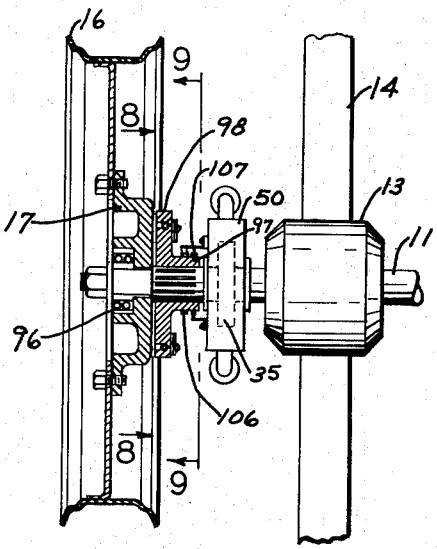
Fig. 7 is a top view of the wheel mounting partly in cross-section.
Figure 8:
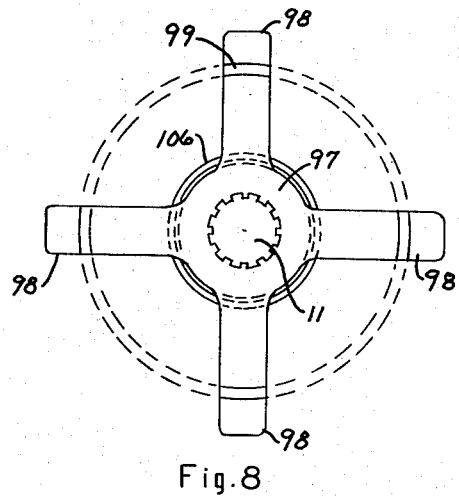
Fig. 8 is an enlarged view taken along lines 8—8 of Fig. 7.
Figure 9:
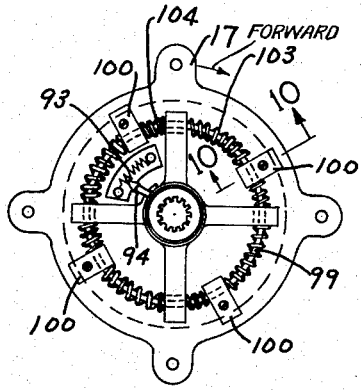
Fig. 9 is a view taken along lines 9—9 of Fig. 7.
Figure 10:
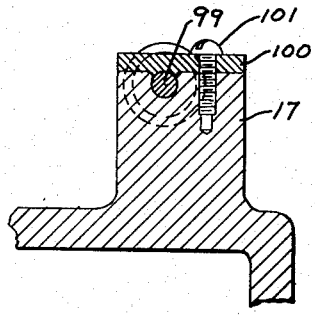
Fig. 10 is an enlarged cross-sectional view taken along lines 10—10 of Fig. 9.

Aside from the current controlled by the speed of the generator, additional control is provided by means of a variable resistance which is actuated by a resilient mechanical coupling between the axle and the wheel. In referring to Figs. 7, 8, 9 and 10, this resilient coupling is now described. The axle 11 rotating in the bearing 13 supported on the frame 14 runs through the brake mechanism 50 and terminates in the wheel 16, the hub 17 of which revolves on the roller bearings 96. This hub 17 is not keyed to the axle 11. A separate driving member 97 is keyed to the shaft, as seen in Figs. 7 and 8, comprising a sleeve carrying four equally spaced arms 98. The arms ride over a ring 99 which is affixed to the hub 17 of the wheel by means of clamps 100 secured by the bolts 101 (Figs. 9 and 10). Over the ring 99 are placed springs 103 and 104 so distributed that, in the forward direction of the vehicle, the rotating arms 98 engage the springs 103, whereas in the rearward rotation, engage springs 104. These springs permit a certain angular displacement between the drive shaft representing the arms 98 and the hub of the wheel 17 until such compression is achieved of the springs 103 or 104 which permits no further angular displacement. Under this condition, the wheels are fully coupled to the drive shaft.

The driving member 97 carries the rider 94 of the variable resistance 93, the terminals of which are brought out through the slip rings 106 and 107 engaging suitable brushes for electrical connection to the system. The resistance 93 mounted on an insulated block is so arranged as to its physical placement that the rider contacts one end terminal thereof in the normal position of the driving member 97, which is the position of the vehicle at rest.

The operation of the torque equalizing system is as follows, and reference should be had to Fig. 6 to follow the schematic circuit. The resistance 93 engaged by the contact arm 94 represents the one associated with the right wheel of the vehicle, and the other designated with the same reference characters bearing primary indices represents the one associated with the left wheel of the vehicle. As long as both wheels have equal torque, an equal amount of resistance is in both circuits. To be precise, the springs 103 are so proportioned in their strength as to permit, for normal traction, complete compression, whereby the rider 94 of the resistance 93 and correspondingly rider 94' of resistance 93' travel fully over the resistances effecting complete ground connection of the respective terminals of the windings of the drive couplings. Therefore, under normal traction conditions, both windings have their ground return terminals completed to the grounded terminal of the generator 53. Now, if one of the wheels should experience less frictional resistance, such as a slippery surface, it will tend to turn freely and this frictional resistance is no longer sufficient to compress the spring 103. Thus, by this resilient coupling of the wheel, the particular driving member 98 returns to or near to the position which moves the rider 94 back into the normal rest position. Stating it in another way, a wheel which is free to rotate, experiencing little or no frictional resistance, can be so rotated by the driving member 98 without at all compressing the spring 103. Under such conditions, the resistance 93 is placed in series in the circuit, and, therefore, in series with the particular winding 23. These windings, as seen in Fig. 4, are cross-connected, that is, the left wheel winding 23 is controlled by the rider 94' associated with the right wheel, and vice versa, the right wheel winding 23 is controlled by the rider 94 associated with the left wheel. It will be seen that as soon as one wheel experiences less road resistance, it will cause a reduction in the coupling efficiency of the fluid coupling associated with the opposite wheel which has higher traction force. The reduced coupling will tend to decrease the power transmitted to the wheel having the higher traction, thereby equalizing the torque between the two wheels. This equalization is automatically effected, depending upon the tractive force in any of the wheels by displacement of the resilient mechanical coupling. In this manner, a continuous torque equalization is maintained over varying road surfaces in a varying degree, depending upon the extent of angular displacement in the flexible coupling of respective traction wheels.

In the reverse direction no differential compensation is necessary and maximum coupling force may be had for both drive couplings. This is automatically obtained by the switches controlled from the lever 56, namely, those having contacts 88 and 90 and contact arms 89 and 91. These are mechanically interlinked with the forward and rear control lever actuating the switch arm 56, as previously described.

What I claim is:

1. A motor vehicle power control system including an engine, a pair of traction wheels driven thereby, said wheels requiring differential speeds when said vehicle moves in a curved path, steering means for said vehicle, a ferromagnetic fluid coupling between each said wheel and said engine, electromagnetic means associated with each said coupling for varying the degree of power transfer from said engine, circuit means for controlling said electromagnetic means, and means in said circuit responsive to the movement of said steering means for differentially controlling each said electromagnetic means when said vehicle moves in a curved path and delay means for holding said differentially controlling means for a predetermined time after the vehicle is directed by said steering means to a straight path.

2. In a motor vehicle drive system, an engine, a pair of traction wheels driven thereby, said wheels requiring differential speeds when said vehicle moves in a curved path, steering means for said vehicle, individual ferromagnetic fluid couplings between said engine and said wheels whereby said wheels may be independently driven, an electromagnet for controlling each said coupling, a current source for said magnets, a circuit interconnecting each said magnet with said source including a series resistance, switching means responsive to the movement of said steering means for shunting said resistances alternately in accordance with the respective direction of the curved path over which said vehicle is to travel, said switching means being substantially instantaneous in removing said shunt but retarded in re-establishing said shunt.

3. In a motor vehicle drive system, an engine, a right traction wheel and a left traction wheel driven thereby, said wheels requiring differential speeds when said vehicle moves in a curved path, a ferromagnetic fluid coupling between said engine and said left wheel, and a ferromagnetic fluid coupling between said engine and said right wheel, whereby said wheels may be independently driven, an electromagnet for said left wheel coupling, and an electromagnet for said right wheel coupling, a current source for said magnets, a circuit interconnecting said left wheel magnet with said source including a resistance in series, a circuit interconnecting said right wheel magnet and said source including a resistance in series, a slow release relay having a pair of contacts normally short circuiting said first-mentioned resistance, and a slow release relay having a pair of contacts normally short circuiting said second-mentioned resistance, a steering mechanism for said vehicle, switching means actuated by said mechanism for controlling the operation of said relays, said means being arranged to initiate current in the relay shunting the series resistance of said left wheel magnet when said latter wheel decribes an arcuate path of smaller diameter than said right wheel, whereby coupling between said engine and said left wheel is diminished while said steering mechanism is actuated, and alternately initiating current in said relay shunting the series resistance of said right wheel magnet when the arcuate path of said last-mentioned wheel is of lesser diameter than that of the other wheel, said short circuits being restored due to said slow release after the vehicle progressed a predetermined distance in a substantially straight path.

4. In a motor vehicle drive system, an engine, a pair of traction wheels driven thereby, a ferromagnetic fluid drive clutch for each wheel transferring motive power from said engine, a ferromagnetic fluid retard clutch for each said wheel mechanically linked with said drive clutch, a generator coupled to said engine delivering operating voltage to said drive clutches, means for controlling the speed of said engine, a circuit including a switch for actuating said retard clutches, said switch being interconnected with said speed control means whereby upon release of said control means said retard clutches effectuate coupling between said wheels and said engine for utilizing the braking power of said engine, said switch disabling said retard clutches upon motive power delivery of said engine.

5. In a motor vehicle drive system, an engine, a pair of traction wheels driven thereby, a ferromagnetic fluid drive clutch for each wheel transferring motive power from said engine, a ferromagnetic fluid retard clutch for each said wheel mechanically linked with said drive clutch, a generator coupled to said engine delivering operating voltage to said clutches, a brake for said vehicle, and means for actuating said retard clutches upon application of said brake, said retard clutches coupling said wheels to said engine for utilizing the braking power thereof when said vehicle is coasting.

6. In a motor vehicle drive system, an engine, a pair of traction wheels driven thereby, a ferromagnetic fluid drive clutch for each wheel transferring motive power from said engine, a ferromagnetic fluid retard clutch for each said wheel mechanically linked with said drive clutch, a generator coupled to said engine delivering operating voltage to said drive clutches when said engine operates at a predetermined speed, means for controlling the speed of said engine, a circuit including a current source, a switch in said circuit having open and closed positions for controlling the current in said retard clutches, said switch being interconnected with said speed control means effecting, upon release of said control means, the closure of said switch whereby said retard clutches provide coupling between said wheels and said engine for utilizing the braking power of said engine.

7. In a motor vehicle drive system, an engine, a pair of traction wheels driven thereby, a ferromagnetic fluid drive clutch for each wheel transferring motive power from said engine, a ferromagnetic fluid retard clutch for each said wheel mechanically linked with said drive clutch, a generator coupled to said engine delivering operating voltage to said drive clutches when said engine operates at a predetermined speed, a current source, a circuit connecting said source to said retard clutches, a brake for said vehicle, and means interlinked therewith comprising a variable resistance in said circuit for applying current to said retard clutches progressively upon application of said brake whereby said retard clutches coupling said wheels to said engine utilize the braking power thereof when said vehicle is coasting.

8. In a motor vehicle drive system, an engine, a pair of traction wheels driven thereby, individual ferromagnetic fluid coupling means between each of said wheels and said engine, means for controlling simultaneously the degree of coupling in accordance with the application of power to said engine, and means for equalizing the torque of said wheels automatically in accordance with the tractive force of said wheels.

9. In a motor vehicle drive system, an engine, a pair of traction wheels driven thereby, individual ferromagnetic fluid coupling means between each of said wheels and said engine, means for controlling simultaneously the effective coupling in accordance with the application of power to said engine, and means for equalizing the torque of said wheels comprising means actuated by each said wheels for automatically reducing the coupling in the coupling means driving the wheel having the greater tractive force.

10. In a motor vehicle drive system, an engine, a pair of traction wheels driven thereby, a selective forward and rear drive for said vehicle, individual ferromagnetic fluid coupling means between each of said wheels and said engine, means for controlling simultaneously the effective coupling in accordance with the application of power to said engine, and means for equalizing the torque between said wheels automatically in accordance with the tractive force of said wheels when the forward drive of said vehicle is selected, and means for automatically disabling said equalizing means when said drive is rearward.

11. In a motor vehicle drive system, an engine, traction wheels having an axle, individual ferromagnetic fluid clutches between each axle and said engine, a magnetizing winding for each said clutch, a current source, a circuit between each said winding and said source, a resilient mechanical coupling between each axle and said wheel providing slippage between said axle and said wheel over a predetermined angle, depending upon the tractive force of said wheel, a current controlling element affixed to each said wheel having a control arm attached to said axle, the current control element of one wheel being in circuit with the winding of the clutch associated with the other wheel, respectively, whereby slippage in any of said wheels due to unequal traction actuating said control arm effectively regulates the current in the winding of the clutch associated with the respective wheel having the greater traction whereby the effective torque of said wheels is substantially equalized.

References Cited in the file of this patent

UNITED STATES PATENTS

| Number | Name | Date |
| --- | --- | --- |
| 694,791 | Sack | Mar. 4, 1902 |
| 732,944 | Jenatzy, Fils | July 7, 1903 |
| 779,351 | Douglas | Jan. 3, 1905 |
| 791,180 | Cantono | May 30, 1905 |
| 1,020,707 | Lemp | Mar. 19, 1912 |
| 1,950,810 | Nichols | Mar. 13, 1934 |
| 2,221,705 | Glynn | Nov. 12, 1940 |
| 2,519,449 | Findley | Aug. 22, 1950 |

FOREIGN PATENTS

| Number | Country | Date |
| --- | --- | --- |
| 485,591 | Belgium | Nov. 13, 1948 |

OTHER REFERENCES

"The Magnetic Fluid Clutch" by Jacob Rabinow, Transactions of A. I. E. E., 33 West 39th Street, New York, New York; vol. 67, December 13, 1948; made available for printing September 3, 1948; Paper 48–238.